April 8, 1947.  E. O. MORTON  2,418,520

ELECTRIC RANGE SURFACE UNIT

Filed Aug. 11, 1942  3 Sheets-Sheet 1

WITNESSES:

INVENTOR
ELDRED O. MORTON.
BY
ATTORNEY

April 8, 1947.  E. O. MORTON  2,418,520
ELECTRIC RANGE SURFACE UNIT
Filed Aug. 11, 1942  3 Sheets-Sheet 2
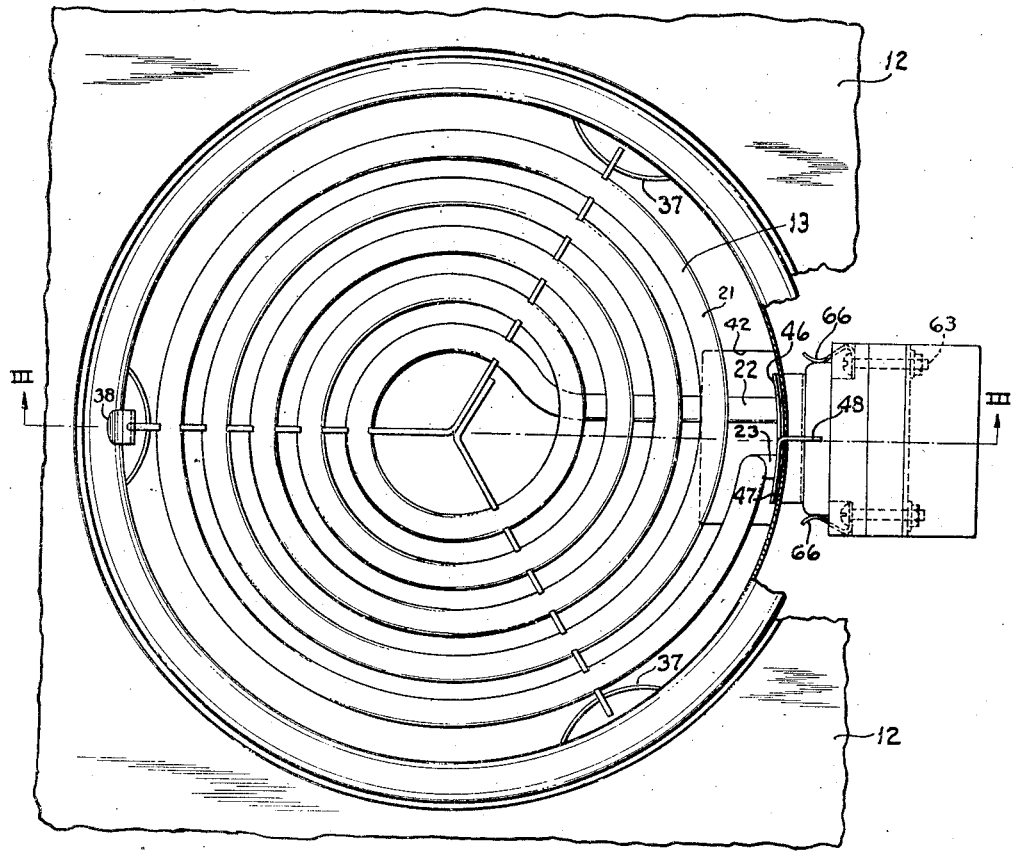
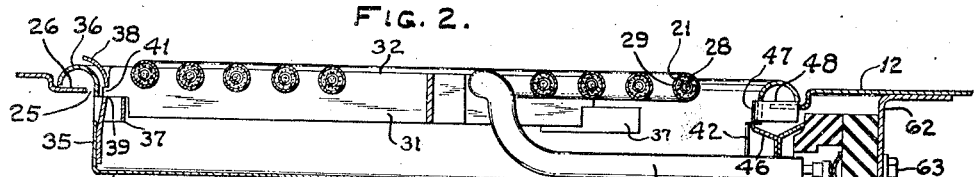
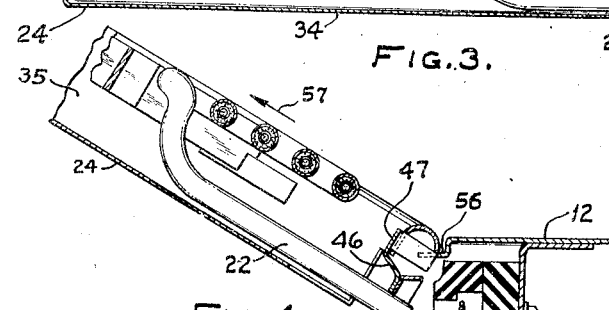
WITNESSES:
INVENTOR
ELDRED O. MORTON.
BY
ATTORNEY April 8, 1947. E. O. MORTON 2,418,520
ELECTRIC RANGE SURFACE UNIT
Filed Aug. 11, 1942 3 Sheets-Sheet 3
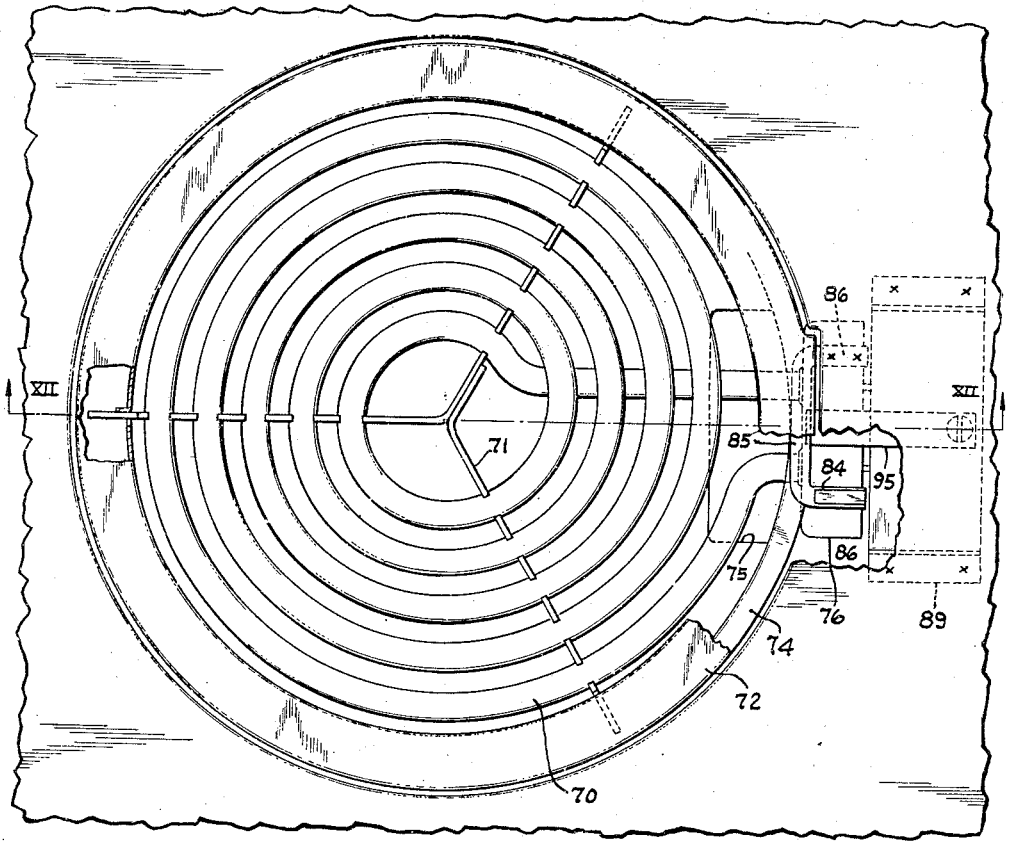
Fig. 11.
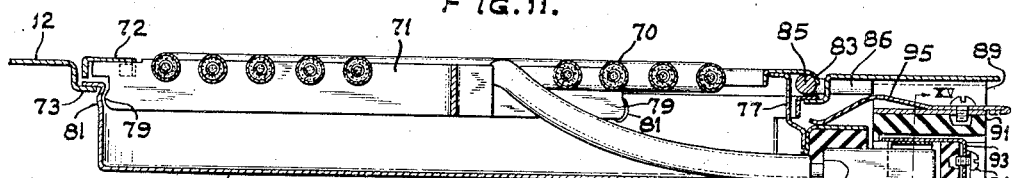
Fig. 12.
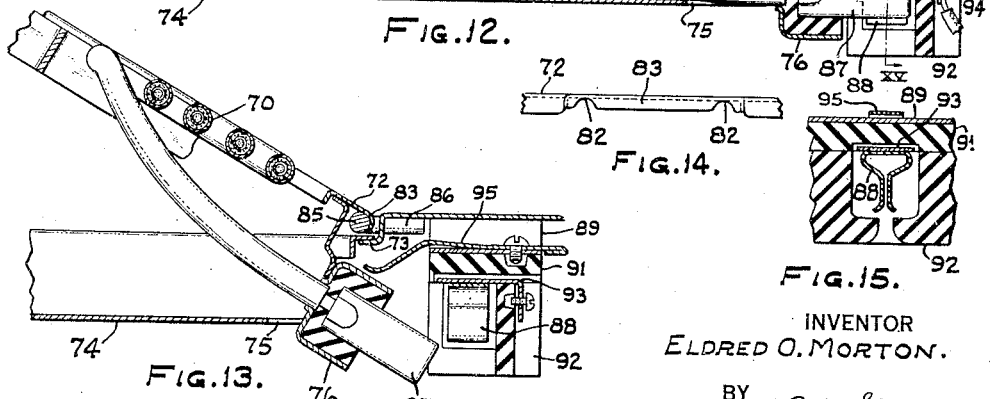
Fig. 13.
Fig. 14.
Fig. 15.
INVENTOR
ELDRED O. MORTON.
BY R. J. Eisinger
ATTORNEY Patented Apr. 8, 1947

2,418,520

UNITED STATES PATENT OFFICE 2,418,520

ELECTRIC RANGE SURFACE UNIT

Eldred O. Morton, Mansfield, Ohio, assignor to Westinghouse Electric Corporation, East Pittsburgh, Pa., a corporation of Pennsylvania Application August 11, 1942, Serial No. 454,398

3 Claims. (Cl. 219—37)

This invention relates to heating appliances and particularly to surface heating units for ranges or the like, and it has for an object to provide an improved device of the character set forth.

Electric ranges and other electrical cooking devices now in use are usually wired with flexible, insulated electrical conductors connected directly to the terminals of the surface units. The portions of the conductors near the surface units are subjected to high temperatures so that the insulation deteriorates and short circuits between adjacent conductors and between the conductors and the metallic range body may develop. In addition to deterioration of the insulation due to high temperatures, the metal conductors are often oxidized so that they may break off with repeated flexings, resulting in open circuits and possibly short circuits. The surface units employed at present have the further disadvantage that they cannot be readily removed from the range body when replacement is required.

It is customary to provide a drip or reflecting pan in which the surface unit is removably supported to permit the pans to be cleaned. These pans have necessarily been of complicated design to permit the surface unit to be removed therefrom, due to the fact that the surface unit is more or less permanently connected to the electrical conductors.

It is an object of the present invention to provide an improved surface unit construction in which the conduction of heat from the heating element of the surface unit to the electric supply conductors is sufficiently low so that deterioration of the insulation covering such conductors is avoided.

It is another object of the invention to provide an improved surface unit construction in which the drip or reflector pan is of simple design and inexpensive to manufacture, and which is readily removable from the surface unit.

It is a further object of the invention to provide an improved surface unit construction in which the heating element thereof may be readily disconnected from the electric supply conductors without the aid of tools.

These and other objects are effected by my invention as will be apparent from the following description and claims taken in connection with the accompanying drawings, forming a part of this application, in which:

Fig. 2 is a plan view, with portions broken away, of one of the surface units of the range illustrated in Fig. 1;

Fig. 3 is a sectional view taken substantially along the line III—III of Fig. 2;

Fig. 4 is a sectional view corresponding to Fig. 3 and illustrating the manner of inserting and removing the surface unit from the range platform;

Fig. 11 is a plan view, corresponding to Fig. 2, illustrating a modified form of the invention;

Fig. 12 is a sectional view taken substantially on the line XII—XII of Fig. 11;

Fig. 13 is a sectional view corresponding to Fig. 12 and illustrating the manner of inserting or removing the heating element from the range platform;

Fig. 14 is a detail view of a portion of a rim fixed to the heating element of the surface unit; and Fig. 15 is a section taken substantially on the line XV—XV of Fig. 12.

Figure 1:
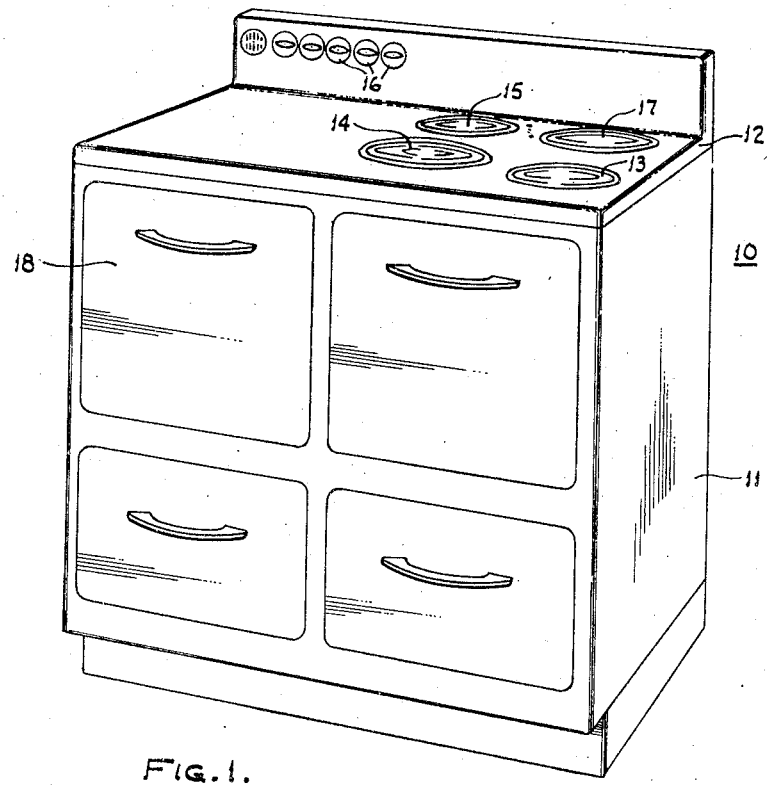
Fig. 1 is a perspective view of an electric cooking range in which the present invention is incorporated.

Referring to the drawings and particularly to Fig. 1, the electric range there shown and generally indicated 10, except as hereinafter pointed out, may be of conventional construction and includes a body portion 11 and a cooking platform 12. The platform has mounted therein, in a manner to be described in detail later, a plurality of surface units, generally indicated 13, 14 and 15, the energization of which is controlled by means of switch knobs 16, here shown as mounted in the backsplasher of the platform. If desired, the range may also be provided with a deep well cooker 17 and an oven (not shown) accessible through a door 18. The heating elements for the deep well cooker 17 and the oven may also be controlled by certain of the knobs 16, as well understood in the art.

In Figs. 2 to 7, inclusive, there is shown in detail the range surface unit 13 which embodies one form of the present invention. The other surface units 14 and 15 may be identical with unit 13. The surface unit 13 generally comprises an electric heating element 21, coiled into a flat spiral, the ends 22 and 23 of which are brought out at one side and below the plane of the heating element, and a metallic drip or reflector pan 24 in which the heating element is removably nested. The reflector pan with the heating element therein is removably received in an opening 25 provided in the platform 12. The margin of the platform surrounding this opening may be offset downwardly, as shown particularly in Fig. 3, to provide a supporting flange 26 for the surface unit.

While the reflector pan is shown as removable from the platform, it is to be understood that the same may be permanently attached to the platform, as by welding, or formed integrally therewith, as disclosed in the copending application of George E. Price, Serial No. 431,212, filed February 17, 1942 and issued January 8, 1946, as Patent No. 2,392,692 and assigned to the assignee of the present invention.

The heating element 21 comprises helically coiled, electrical resistance element 28 supported within a metallic tubular sheath 29, by means of highly-compacted heat-conducting electrical insulating material, such as magnesium oxide, which maintains the resistance element in spaced concentric relation within the sheath. The armored heating element is supported in a metal spider 31, being gripped in notches provided along the upper edges of the arms 32 of the spider in a known manner.

The reflector pan 24 comprises a bottom wall 34 and a continuous side wall 35, the upper edge of which is turned outwardly to provide a flange 36 adapted to rest on the flange 26 of the platform 12. The side wall 35 of the reflector pan is provided with struck-in portions or lugs 37 on which the outer ends of the arms of the spider 31 are adapted to rest to support the heating element with its upper plane slightly above the top of the flange 36 and the platform 12.

As shown particularly in Figs. 2 and 3, a latch spring 38 may be spot-welded or otherwise secured at one end to the side wall 35 of the pan and provided with an opening 39 for receiving a reduced projecting end 41 of the adjacent spider arm to latch the heating element and its spider in the pan. When it is desired to remove the heating element and its spider from the pan, it is necessary only to press the free upper end of the latching spring 38 outwardly to disengage the spring from the projection 41. While the latching arrangement has been shown applied to only one arm of the spider, it will be appreciated that the same may be applied to each of the arms thereof, if desired.

The side wall 35 of the reflector pan at a part opposite the latch 38 is provided with a rectangular opening 42 which extends into the bottom wall 34. This opening is of a size to permit a metallic terminal guard 43 fixed to the projecting ends 22 and 23 of the heating element, to be pressed therethrough. As shown particularly in Fig. 7, this opening 42 has a notch 44 which extends upwardly toward the rim of the drip pan. The purpose of this notch will appear later. The mentioned terminal guard, which may take the form of a shell or rectangular box, is fixed, as by brazing or welding, or crimping it to the ends 22 and 23 of the sheath 29 of the heating element a short distance from terminals 45 fixed to the ends of the heating element.

The terminal guard 43 has fixed thereto a bracket 46, the upper portion 47 of which is offset with respect to the terminal guard and of substantially the same curvature as the side wall 35 of the reflector pan. This upper portion 47 carries a finger or tongue 48 which, as shown in Fig. 2, may be formed by striking out a portion of the bracket.

Figure 5:
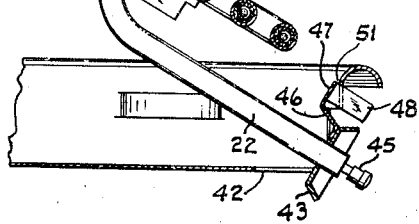
Fig. 5 is a sectional view illustrating the manner of inserting or removing the heating element of the surface unit from its reflecting pan.
Figure 7:
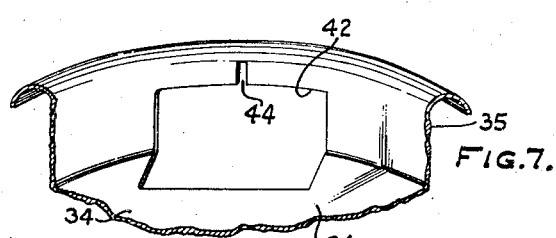
Fig. 7 is a detail perspective view of a portion of the reflecting pan of the surface unit.

The manner of assembling the heating element 21 in the reflector pan 24 and the complete surface unit in the platform 12 has been shown in Figs. 5 and 4, respectively. To assemble the heating element 21 in the reflector pan 24, the heating element is tilted at an angle between 30 and 45 degrees with respect to the plane of the reflector pan and the terminal guard 43 inserted through the opening 42 to bring the finger or tongue 48 in the notch 44, this position of the heating element and reflector pan being shown in Fig. 5. In this position, the upper edge of the bracket 46 rests on or engages the inner surface of the side wall of the pan, as indicated at 51, while the finger 48, by its engagement in the notch 44, definitely positions the heating element with respect to the pan so that the same may then be swung downward about 51 as a fulcrum into nesting relation within the pan, and with the free ends of the spider resting on the supporting lugs 37. In swinging the surface unit into the pan in the manner described above, the projecting end 41 of the spider forces the latch spring 38 outwardly until this end 41 slips into the opening 39 provided in the latch spring to lock the surface unit in position. To remove the surface unit from the reflector pan, the above procedure may be reversed, the latch 38 being released and the surface unit swung up to the position shown in Fig. 5 and the surface unit then being removed in the direction indicated by the arrow 53.

Figure 6:
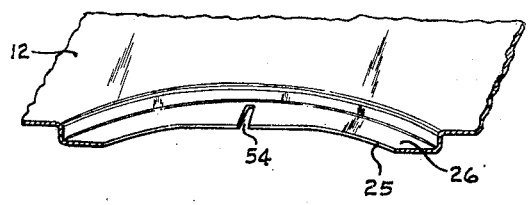
Fig. 6 is a detail perspective view of a portion of the range platform.

In Fig. 6, a portion of the platform 12 at the surface unit receiving opening 25, is shown on an enlarged scale. As shown, a portion of the flange 26 of the platform is widened and provided with a notch 54 which, in function, corresponds to the notch 44 provided in the reflector pan. With the heating element nested in the reflector pan, the surface unit is brought to the platform and tilted at an angle between 30 and 45 degrees to the plane of the platform and held so that the finger or tongue 48 is engaged in the notch 54 of the platform flange 26, and with the outer edge of the reflector pan rim resting on the upper surface of this flange. This position of the surface unit with respect to the platform is shown in Fig. 4. The surface unit is then swung downwardly about the fulcrum point provided by the engagement of the reflector pan rim with the flange 26 adjacent the notch 54, as indicated at 56, until the surface unit is in the position shown in Fig. 3. To remove the surface unit from the platform, the above assembly operations are reversed until the parts are in the position shown in Fig. 4, whereupon the element may be removed in the direction indicated by the arrow 57 of that figure.

In order to connect the surface unit to the supply conductors, there is provided a terminal receptacle, generally indicated 58. This receptacle is mounted in such a position that as the surface unit is swung into and out of the platform opening 25, the terminals 45 thereof engage contacts 59 provided in the terminal receptacle. It will be understood that this terminal receptacle is provided with a contact for each terminal of the surface unit. In the particular embodiment illustrated, a single heating element having two terminals has been shown although a plural coil element with three or more terminals may be employed if desired.

The terminal receptacle comprises a block of insulating material 61 which may be supported in any suitable manner below the platform 12 of the range, with the contacts carried thereby in proper position to engage the terminals of the heating unit. As shown in Fig. 3, the terminal receptacle is supported directly from the platform 12 by means of a bracket 62 fixed thereto and secured to the terminal receptacle by the bolts 63. These bolts also serve to secure a cover plate 64, also of insulating material, to the block 61.

The contacts 59 comprise spring strips which are fixed at their lower ends to the block 61 by means of terminal screws 65 to which the supply conductors are connected, as shown in Fig. 3. The upper ends of the contact springs 59 are free and biased outwardly, as shown in Fig. 4, to provide the proper contact pressure between the terminals 45 and the contacts 59 when the surface unit is mounted in the range platform. The contacts 59, which engage the terminals 45 of the heating element, may be formed of silver or monel metal, or any other suitable material found satisfactory.

The cover plate 64 is provided with openings through which the terminals 45 of the surface unit may pass as the surface unit is swung into and out of the platform opening 25.

By reference to Fig. 3, it will be noted that when the surface unit is disposed in the range platform, the terminal guard 43 extends beneath the platform and thereby prevents any matter which might be spilled on the platform from dripping down through the platform opening 25 onto the terminals 45 and contacts 59, the guard being shaped so that this spillage will drain away from the terminals.

In order to ground the surface unit sheath 29, the terminal receptacle 61 is provided with a pair of ground clips or springs 66 which, as shown in Fig. 2, may be fixed to the block 58 by means of the clamping bolts 63. If desired, a conductor may be secured to each of the bolts 63 and connected to the frame of the range. These clips, as shown in Fig. 2, are arranged to engage the ends of the terminal guard 43 when the surface unit is disposed within the platform. These grounding clips 66 are arranged to be in contact with the terminal guard 43 before the terminals 45 engage the contacts 59, when installing the surface unit, to insure that the surface unit is grounded before the electrical connection is made between the surface unit and the supply conductors. When removing the surface unit, it remains grounded until after the connection with the supply conductors is broken.

Figures 8, 9, 10:
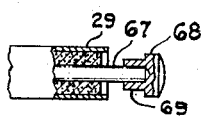
Fig. 8 is an elevational view, partly in section, of one of the terminals of the heating element.
Figs. 9 and 10 are end and side elevational views of a terminal.

While the terminals 45 may be of any desired construction, a preferred form is shown in Figs. 8 to 10. As well understood in the art, armored heating elements of the type herein disclosed are provided with terminal rods 67 to which the helically coiled resistance element is fixed. These rods project outwardly beyond the ends of the sheath 29 of the heating element. The contacts 45 comprise a head portion 68, one surface of which is preferably rounded so that as the surface unit is swung into or out of the platform opening 25, this rounded surface will have a smooth wiping action on the spring contacts 59 carried in the terminal receptacle 58. The entire contact shown in Figs. 9 and 10 may be formed of silver or monel metal, or merely the contact-engaging surface thereof. The side of the head opposite the rounded face is provided with a hollow shank 69 which may be bifurcated, if desired. The bore of the hollow shank is of a size to receive the terminal rod 67 of the heating element. After the contact has been slipped on the terminal rod 67, the sides of the shank may be simultaneously pressed down on and spot-welded to the terminal rod by means of suitably shaped electrodes to provide a permanent connection.

In Figs. 11 to 15, inclusive, there is shown a modified form of the invention in which knife-blade connections are used in place of the butt-type connection shown in the first embodiment and which also employs a different guiding and pivoting means for the surface unit. This embodiment is generally similar to that described above and includes a flat spiral armored heating element 70 which is supported in a spider 71 in the manner similar to that described above. However, the spider carries a flanged annular rim 72 which is fixed to the outer ends of the spider arms. The outer flange of this rim supports the heating element on the supporting flange 73 of the range platform.

A reflector pan 74, like the pan 35, is supported on or integral with the platform flange 73 and is provided with a rectangular opening 75 formed in the side wall and bottom wall of the pan. However, the notch 44 provided on the pan 24 is omitted. The rectangular opening is of a size to receive a terminal block 76 fixed to the ends of the heating element 70. If desired, a supporting strap 77 may be fixed to the metallic terminal guard 76 and the mentioned rim 72.

The heating element is detachably latched to the reflector pan 74 in the manner illustrated in Fig. 12, where it will be noted that the ends of the spider 71 are provided with rounded projections 79 adapted to be received in recesses 81 formed in the side wall of the reflecting pan just below the outwardly-turned flange thereof. The resiliency of the side wall of the reflector pan permits the projections 79 of the spider to be snapped into and out of the recesses 81.

The side of the rim 72, preferably opposite one of the arms of the spider, is provided with notches 82 in the outer flange thereof, as shown in Fig. 14. This portion of the flange is preferably straight between the notches, as shown in Fig. 11, and curves downwardly, as shown in Figs. 12 and 13, to provide a hook portion 83. This hook portion is adapted to engage the bight 85 of a U-shaped rod 84 which is fixed to the under surface of the platform with the bight projecting outwardly over the supporting flange 73. The mentioned notches 82 provide clearance for the legs 86 of the U-shaped rod and serve to position the surface unit angularly with respect to the platform opening.

The manner of inserting and removing the heating element from the platform will be clear from an inspection of Fig. 13 where it will be noted that the heating element is tilted at an angle of approximately 30 to 45 degrees to the platform and the terminal guard 76 is inserted through the rectangular opening 75 in the reflector pan. The pan may be either latched to the heating element by means of the projections 79 and the recesses 81 or disposed in the platform opening, as shown in Fig. 13. The hook portion 83 of the rim 72 in this position of the heating element engages the bight 85 of the U-shaped rod 84 and functions as a hinge about which the heating element is swung into or out of the platform.

As in the first embodiment, in swinging the heating element into and out of the platform, the terminals of the heating element engage contacts carried by the platform.

The particular contact structure shown in Figs. 11 to 15 comprises knife-blade members 87, preferably welded to the terminal rods of the heating elements, with the inner ends disposed within the terminal guard 76. As shown in Fig. 12, the terminal guard comprises a metallic shell filled with an electrical insulating material. Female contacts 88 are mounted on the under surface of the platform adjacent the opening therein and in alignment with the U-shaped hinge rod 84 for receiving the knife-blade member 87.

The contacts 88 are supported in a terminal block structure comprising a supporting strap 89 fixed to the under surface of the platform and a block structure which includes a top plate 91 and a lower slotted block 92. The plate 91 and block 92 are bolted to the supporting strap. The contacts 88 comprise inverted U-shaped spring clips fixed to terminal plates 93 bent down at one end and provided with apertures to receive screws 94 to which the supply conductors are connected. The U-shaped contacts 88 are preferably of spring metal and each of them depends into an enlarged recess in the block 92. The contacts have limited movement in these recesses since the terminal blades 93 are slidable on the block 92 in a space provided between this block and the plate 91.

As the heating element is swung into and out of the platform opening, in the manner described above, the knife-blade members 87 fixed to the ends of the heating element swing into and out of the U-shaped contact members 88. By virtue of the limited freedom of movement of these contact members 88, they align themselves with the knife-blade terminals 87.

A grounding clip 95, which may be fixed to the supporting strap 89 of the terminal block structure, engages the metallic shell of the terminal guard 76, as shown in Fig. 12, and remains in contact with this guard until the connection between the knife blades and their respective U-shaped contacts is broken. A grounding arrangement similar to that described above in connection with the first embodiment may be used instead of the clip 95, if desired.

While the invention has been shown in several forms, it will be obvious to those skilled in the art that it is not so limited, but is susceptible of various other changes and modifications without departing from the spirit thereof, and it is desired, therefore, that only such limitations shall be placed thereupon as are specifically set forth in the appended claims.

What is claimed is:

1. A surface unit for a range or the like comprising a substantially flat heating element having a terminal projecting beyond one edge and below the top surface thereof, a pan adapted to receive said surface unit, said pan having an opening in one side thereof disposed entirely within the body of said pan through which said terminal extends, means disposed on the side of said pan opposite said opening for detachably latching said surface unit in said pan, and tongue means carried by said heating element, said pan having a notch therein to receive said tongue means to guide said heating element into said pan.

2. A range comprising a body having a platform, said platform having an opening therein adapted to receive an electric surface unit, a surface unit removably received in said opening, a tongue carried by said surface unit, said platform having a notch therein at said opening, said tongue being receivable in said notch to guide said unit into said opening, a terminal projecting horizontally from said surface unit, and a terminal receptacle secured below said platform adjacent said opening and arranged to removably receive said terminal.

3. A range comprising a cooking platform, said platform having an opening therein, an electric contact, connectible to a source of electrical energy, supported beneath said platform adjacent said opening, a pan supported in said opening, said pan having an opening therein aligned with said contact and also having a notch in the upper edge of said opening, said platform having a notch therein adjacent and in registry with the notch in the pan, an electric surface unit removably supported above said pan, said surface unit having a terminal projecting from one side below the top thereof, said terminal extending through said pan opening into engagement with said contact, said surface unit being removable from said platform opening by tilting about a horizontal axis adjacent said contact, and a tongue carried by said surface unit and adapted to be inserted into both of said notches upon inserting said surface unit in the opening in the platform to align said pan with said platform and to align said surface unit with said pan and said electric contact.

ELDRED O. MORTON.

REFERENCES CITED

The following references are of record in the file of this patent:

UNITED STATES PATENTS

| Number | Name | Date |
| --- | --- | --- |
| 757,192 | Houghton | Apr. 12, 1904 |
| 1,801,614 | Serrell | Apr. 21, 1931 |
| 1,574,308 | Rutenber | Feb. 23, 1926 |
| 1,992,056 | Colbie | Feb. 19, 1935 |
| 2,325,358 | Andrews | July 27, 1943 |
| 2,320,041 | McCormick | May 25, 1943 |
| 1,179,728 | Knapp | Apr. 18, 1916 |
| 1,967,091 | Kempton | July 17, 1934 |

FOREIGN PATENTS

| Number | Country | Date |
| --- | --- | --- |
| 692,301 | German | June 17, 1940 |
| 823,439 | French | Oct. 18, 1937 |